United States Patent
Stölzl et al.

(10) Patent No.: US 7,289,930 B2
(45) Date of Patent: Oct. 30, 2007

(54) METHOD FOR MONITORING TYRE PRESSURE MONITORING SYSTEMS IN A MOTOR VEHICLE

(75) Inventors: Stefan Stölzl, Weinheim (DE); Martin Griesser, Eschborn (DE); Andreas Köbe, Bensheim (DE); Peter Lauer, Bad Vibel (DE); Vladimir Koukes, Darmstadt (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 10/568,125

(22) PCT Filed: Jul. 29, 2004

(86) PCT No.: PCT/EP2004/051649

§ 371 (c)(1),
(2), (4) Date: Feb. 14, 2006

(87) PCT Pub. No.: WO2005/018962

PCT Pub. Date: Mar. 3, 2005

(65) Prior Publication Data

US 2006/0212256 A1    Sep. 21, 2006

(30) Foreign Application Priority Data

Aug. 14, 2003 (DE) ............... 103 37 778

(51) Int. Cl.
G00P 3/00 (2006.01)
B60C 23/00 (2006.01)

(52) U.S. Cl. ............... 702/148; 340/442

(58) Field of Classification Search ............... 702/148, 702/138, 142; 73/146, 146.2; 340/442, 340/444; 701/70
See application file for complete search history.

(56) References Cited

U.S. PATENT DOCUMENTS

| | | | | |
|---|---|---|---|---|
| 5,218,862 A | * | 6/1993 | Hurrell et al. | 73/146.5 |
| 5,483,220 A | * | 1/1996 | Kushimoto et al. | 340/444 |
| 5,561,415 A | * | 10/1996 | Dieckmann | 340/442 |
| 5,583,483 A | * | 12/1996 | Baumann | 340/444 |
| 5,629,478 A | * | 5/1997 | Nakajima et al. | 73/146.2 |
| 5,721,528 A | * | 2/1998 | Boesch et al. | 340/442 |
| 5,753,809 A | * | 5/1998 | Ogusu et al. | 73/146.2 |
| 5,764,137 A | * | 6/1998 | Zarkhin | 340/444 |
| 6,112,165 A | * | 8/2000 | Uhl et al. | 702/138 |
| 6,278,363 B1 | * | 8/2001 | Bezek et al. | 340/442 |
| 6,385,553 B1 | | 5/2002 | Naito et al. | 702/138 |
| 6,510,375 B2 | * | 1/2003 | Faye | 701/93 |
| 6,612,165 B2 | * | 9/2003 | Juzswik et al. | 73/146.5 |
| 6,658,928 B1 | * | 12/2003 | Pollack et al. | 73/146 |
| 6,762,077 B2 | * | 7/2004 | Schuurmans et al. | 438/112 |
| 6,771,169 B1 | * | 8/2004 | Kaminski et al. | 340/442 |
| 6,775,632 B1 | * | 8/2004 | Pollack et al. | 702/104 |
| 6,799,129 B2 | * | 9/2004 | Schmidt et al. | 702/73 |
| 6,802,213 B1 | * | 10/2004 | Agrotis | 73/146 |
| 6,842,109 B2 | * | 1/2005 | Lin | 340/442 |
| 6,914,523 B2 | * | 7/2005 | Munch et al. | 340/447 |
| 6,934,659 B2 | * | 8/2005 | Polzin | 702/140 |
| 6,946,954 B2 | * | 9/2005 | Piech et al. | 340/444 |

FOREIGN PATENT DOCUMENTS

| | | |
|---|---|---|
| DE | 19917034 | 11/2000 |
| DE | 10060392 | 6/2002 |
| EP | 0832767 | 7/2003 |
| WO | 0187647 | 11/2001 |
| WO | 03006268 | 1/2003 |

* cited by examiner

*Primary Examiner*—Bryan Bui
*Assistant Examiner*—Toan M. Le

(57) ABSTRACT

Disclosed is a method of monitoring tire pressure monitoring systems in a motor vehicle. The motor vehicle has a tire pressure monitoring system with indirect measurement which detects tire inflation pressure loss on the basis of wheel speed data, and a tire pressure monitoring system with direct measurement (TPMS) which detects tire inflation pressure loss from tire inflation pressure values measured directly by pressure modules on the vehicle tire. According to the method a warning relating to tire inflation pressure loss emitted by a pressure module of the tire pressure monitoring system with direct measurement (TPMS) is not transmitted to the driver until this tire inflation pressure loss is confirmed by the tire pressure monitoring system with indirect measurement or by all pressure modules that are still working in fail-free manner. Also disclosed is a computer program product.

6 Claims, No Drawings

METHOD FOR MONITORING TYRE PRESSURE MONITORING SYSTEMS IN A MOTOR VEHICLE

BACKGROUND OF THE INVENTION

The present invention relates to a method of monitoring tire pressure monitoring systems in a motor vehicle having both a direct pressure measuring system and an indirect pressure measuring system, as well as to a computer program product containing the method therein.

Tire pressure monitoring systems are used at an increasing rate in up-to-date vehicles in order to improve safety. On the one hand, so-called direct tire pressure monitoring systems are known in the art which monitor the tire inflation pressure by means of pressure modules in the vehicle tires. Further, so-called indirect tire pressure monitoring systems are known in the art, e.g. from WO 01/87647 A1, U.S. Pat. No. 6,385,553 B1, and EP 0 832 767 B1, which determine the tire inflation pressure from rotational speed data (wheel speed, angular velocity, frequency, etc.) of the vehicle wheels. DE 100 60 392 A1 also discloses a tire pressure monitoring system which describes a combination of an indirect tire pressure monitoring system and a reduced direct tire pressure monitoring system. This tire pressure monitoring system uses, on the one hand, the wheel speed data of wheel sensors which are already provided in a vehicle with an anti-lock system (ABS), while, on the other hand, it uses directly measured tire inflation pressures which are provided in one to two pressure modules in the vehicle tires in order to detect tire inflation pressure loss. Thus, the tire pressure monitoring system described in DE 100 60 392 A1 includes two tire pressure monitoring systems (direct and indirect) which are designed independently of one another, and each of these tire pressure monitoring systems generates a warning signal independently of the other tire pressure monitoring system, while taking into consideration defined evaluation criteria.

The advantage of the tire pressure monitoring system with direct measurement (TPMS) involves that tire inflation pressure loss is detected on each individual wheel and on a combination of optional wheels. However, this system suffers from the shortcoming that the required pressure modules in the tires in general are not designed redundantly or, respectively, that the pressure modules are not monitored, with the possible result of omission of alarms or the occurrence of spurious alarms as far as tire inflation pressure loss is concerned.

As has been described hereinabove, the tire pressure monitoring system with indirect measurement is based on the rotational speed data of the rotational speed sensors which are provided in an anti-lock system (ABS). These wheel speed sensors are monitored in a per se known fashion in the anti-lock system (ABS). This condition allows detecting a possible defect of one or more of the wheel speed sensors, with the result that spurious alarms due to defective wheel speed sensors are almost ruled out. It is, however, disadvantageous in this system that a simultaneous tire inflation pressure loss on all wheels cannot be detected under certain circumstances. The system detects tire inflation pressure loss by way of different wheel speeds of the individual wheels, and a wheel suffering from tire inflation pressure loss rotates faster than a wheel without tire inflation pressure loss. If all wheels exhibit the same tire inflation pressure loss, the system does not detect this simultaneous tire inflation pressure loss because the difference in rotational speeds is missing.

SUMMARY OF THE INVENTION

Based on the combination of a tire pressure monitoring system with indirect measurement and a tire pressure monitoring system with direct measurement (TPMS), an object of the invention is to provide a method which monitors the tire pressure monitoring system with indirect measurement and the tire pressure monitoring system with direct measurement (TPMS) to such effect that warnings of the tire pressure monitoring system with direct measurement (TPMS) concerning tire inflation pressure loss are checked by reviewing the output signals of the tire pressure monitoring system with indirect measurement.

According to the invention, this object is achieved by a method of monitoring tire pressure monitoring systems in a motor vehicle. The motor vehicle has a tire pressure monitoring system with indirect measurement which detects tire inflation pressure loss on the basis of wheel speed data, and a tire pressure monitoring system with direct measurement (TPMS) which detects tire inflation pressure loss from tire inflation pressure values measured directly by pressure modules on the vehicle tire. According to the method a warning relating to tire inflation pressure loss emitted by a pressure module of the tire pressure monitoring system with direct measurement (TPMS) is not transmitted to the driver until this tire inflation pressure loss is confirmed by the tire pressure monitoring system with indirect measurement or by all pressure modules that are still working in fail-free manner.

In a favorable embodiment, the tire pressure monitoring system with direct measurement (TPMS) and the tire pressure monitoring system with indirect measurement have equal detection thresholds for tire inflation pressure loss.

In another favorable embodiment, the tire pressure monitoring system with direct measurement (TPMS) and/or the tire pressure monitoring system with indirect measurement include an installation position detection device which renders it possible to allocate a tire with an inflation pressure loss to an installation position (left front wheel, right front wheel, left rear wheel, right front wheel).

Additional preferred embodiments can be taken from the following description of some embodiments.

DETAILED DESCRIPTION

As a basic configuration, a motor vehicle equipped with a tire pressure monitoring system with direct measurement (TPMS) and a tire pressure monitoring system with indirect measurement is considered. The tire pressure monitoring system with indirect measurement is based on rotational speed data (wheel speed, angular velocity, frequency, etc.) being determined by means of rotational speed sensors. In addition, a four-wheel vehicle shall be considered in the following, while the method of the invention can be transferred also to vehicles with a smaller or larger number of wheels. The tire pressure monitoring system with direct measurement (TPMS) includes a pressure module disposed in or on each wheel and transmitting in regular intervals a tire inflation pressure value or a signal proportional to the tire inflation pressure to an evaluating device in a per se known fashion. The transmission of the inflation tire inflation pressure can take place e.g. by way of a transmitter connected to the pressure module and a receiver connected to the evaluating device.

In a likewise per se known manner, the tire pressure monitoring system with indirect measurement determines values from rotational speed data of the wheels which permit concluding tire inflation pressure loss on one to three vehicle wheels. E.g. the wheel speed sensors of an anti-lock system (ABS) which is provided in the vehicle are used for this purpose.

Thus, the method of the invention, in the ideal case, has at its disposal four directly measured tire inflation pressures and four tire inflation pressures determined by the four wheel speed sensors.

The method of the invention eliminates the shortcomings described hereinabove because prior to a warning concerning tire inflation pressure loss of one of the tire pressure monitoring systems, this warning is checked in terms of correctness by examining the signals of the other tire pressure monitoring system. As the wheel speed sensors of the tire pressure monitoring system with indirect measurement are monitored, as has been described above, this system is made the basis as a reference system because it is regarded as being rather insusceptible to faults. Hence, the tire pressure monitoring system with indirect measurement is essentially used to confirm the warnings emitted by the tire pressure monitoring system with direct measurement (TPMS).

On the basis of a vehicle equipped with four pressure modules and four wheel speed sensors, a warning with respect to a tire inflation pressure loss is not triggered according to the method of the invention as long as the tire pressure monitoring system with indirect measurement does not detect tire inflation pressure loss. The case that all wheels suffer from a simultaneous tire inflation pressure loss will be referred to separately hereinbelow. It should be noted in this respect that both the tire pressure monitoring system with indirect measurement and the tire pressure monitoring system with direct measurement (TPMS) include the same detection thresholds for tire inflation pressure loss. If it is indicated by a first pressure module that tire inflation pressure loss prevails, but neither the tire pressure monitoring system with indirect measurement, nor an additional pressure module indicate tire inflation pressure loss, the first pressure module is considered faulty and will no longer be used for the continued monitoring operation. Thus, future monitoring in terms of tire inflation pressure loss will be executed by the four wheel speed sensors and the remaining three pressure modules. If, in turn, a second pressure module indicates that tire inflation pressure loss prevails, but neither the tire pressure monitoring system with indirect measurement, nor the remaining pressure modules confirm such tire inflation pressure loss, the second pressure module is also considered as faulty and will no longer be used for the continued monitoring operation. Thus, a graduated monitoring concept is achieved which detects warnings emitted by faulty pressure modules. As long as at least two pressure modules work properly, even tire inflation pressure loss on all wheels can be detected reliably because the tire pressure monitoring system with indirect measurement does not indicate tire inflation pressure loss, whereas the at least two pressure modules trigger a warning concerning tire inflation pressure loss. As it is unlikely that two pressure modules will fail simultaneously, the method of the invention identifies the situation described as tire inflation pressure loss on all wheels.

Only when merely one pressure module prevails in the system or has so far been deemed fail-free, respectively, it is no longer possible in the event of a warning concerning tire inflation pressure loss from this pressure module and in the absence of a warning from the tire pressure monitoring system with indirect measurement, to state with certainty whether the pressure module is faulty or whether tire inflation pressure loss exists on all wheels. Therefore, a warning will be given to the operator in this situation for reasons of safety.

The method of the invention operates reliably also in those cases where e.g. a spare wheel without a pressure module is mounted, or when new wheels or tires without pressure modules are substituted for wheels with worn tires. When e.g. a spare wheel without pressure modules is mounted, and monitoring previously based on four wheel speed sensors and four pressure modules, the future monitoring operation is performed only with the remaining three pressure modules (one wheel with a pressure module was exchanged with a spare wheel without a pressure module). If e.g. two wheels or tires of an axle are exchanged and these wheels or tires are not equipped with pressure modules, the method of the invention will operate on the basis of the remaining pressure modules, as described hereinabove.

When one or more faulty pressure modules have been detected, this condition can be indicated directly to the driver e.g. by way of a warning lamp or similar devices. As the method of the invention, as has been described hereinabove, continues detecting tire inflation pressure loss in a reliable manner even in a case of failure of one or more pressure modules, it is also possible to indicate the faulty pressure module(s) only during vehicle inspection in order not to disconcert the driver by the lighting up of a warning lamp.

If, on the other hand, the tire pressure monitoring system with indirect measurement fails, which implies failure of a wheel speed sensor and, thus, failure of the anti-lock system (ABS), this failure will be indicated to the driver.

When a tire pressure monitoring system with direct measurement (TPMS) equipped with an installation position detection device of the vehicle wheels is used for the method of the invention, it is possible to further refine the method of the invention in terms of monitoring the pressure modules. The term 'installation position detection' implies that it is known to the tire pressure monitoring system with direct measurement (TPMS) on which installation position (front left wheel, front right wheel, left rear wheel, right rear wheel) a vehicle wheel with a pressure module is placed. A known possibility for installation position detection refers to the use of several receivers or reception antennas. This provision allows allocating the pressure modules or the wheels in which the pressure modules are contained to the installation positions e.g. by way of a field intensity detection unit. Other methods or devices for installation position detection known in the art can also be used to further improve the method of the invention.

The tire pressure monitoring system with indirect measurement is also equipped with an installation position detection device if the installation positions of the wheel speed sensors are known to the system. Installation position detection renders it possible to indicate directly to the driver which pressure module (e.g. pressure module in the left front wheel) has failed. This indication can alternatively occur only during vehicle inspection, as has been described hereinabove.

Further, any other type of monitoring the pressure modules used can be carried out, e.g. by an own error monitoring device of the tire pressure monitoring system with direct measurement (TPMS) or by any other device in the vehicle. If failure of one or more pressure modules is detected in this case, further monitoring in terms of tire inflation pressure loss is executed according to the method of the invention on the basis of the still remaining pressure modules, as described before.

The invention claimed is:

1. A method of monitoring tire pressure monitoring systems in a motor vehicle, the motor vehicle having a first tire pressure monitoring system which detects tire inflation pressure loss on the basis of wheel speed data for each wheel of the vehicle, and a second tire pressure monitoring system which detects tire inflation pressure loss from tire inflation pressure values measured directly by one or more pressure modules, on a vehicle tire, the method comprising:

emitting a warning relating to tire inflation pressure loss by a pressure module of the second tire pressure monitoring system to a driver when tire inflation pressure loss is confirmed by the first tire pressure monitoring system with or by all pressure modules that are still working in fail-free manner.

2. The method according to claim 1, wherein a pressure module which generated an unconfirmed warning relating to tire, inflation pressure loss is considered as faulty, and the tire inflation pressure values supplied from this pressure module are not taken into account in the continued monitoring operation.

3. The method according to claim 1, wherein a warning is given to the driver upon failure of the first tire pressure monitoring system.

4. The method according to claim 1, wherein a failure of one or more pressure modules is indicated to the driver.

5. A method according to claim 1, wherein a failure of one or more pressure modules is indicated only during vehicle inspection.

6. A method according to claim 1, wherein the second tire pressure monitoring system detects tire inflation pressure loss from one or more pressure modules provided for two or more tires.

* * * * *